(12) United States Patent
Burchill, Jr. et al.

(10) Patent No.: US 7,144,522 B2
(45) Date of Patent: Dec. 5, 2006

(54) COMPOSITION FOR THERMAL INSULATING LAYER

(75) Inventors: G. Stuart Burchill, Jr., 1998 Morning Sun La., Naples, FL (US) 34119; Peter Wachtel, Scotchplains, NJ (US)

(73) Assignee: G. Stuart Burchill, Jr., Naples, FL (US)

( * ) Notice: Subject to any disclaimer, the term of this patent is extended or adjusted under 35 U.S.C. 154(b) by 57 days.

(21) Appl. No.: 10/986,433

(22) Filed: Nov. 12, 2004

(65) Prior Publication Data

US 2005/0148692 A1    Jul. 7, 2005

Related U.S. Application Data

(60) Provisional application No. 60/519,400, filed on Nov. 12, 2003.

(51) Int. Cl.
  *C08K 7/22* (2006.01)
  *C08K 7/24* (2006.01)
  *C08K 7/26* (2006.01)
  *B32B 5/18* (2006.01)

(52) U.S. Cl. .......... 252/62; 106/122; 524/492; 524/495; 524/847; 428/312.2; 428/312.6; 428/315.5; 428/317.3

(58) Field of Classification Search ............ 252/62; 106/122; 524/492, 495, 847; 428/312.2, 428/312.6, 315.5, 317.3
See application file for complete search history.

(56) References Cited

U.S. PATENT DOCUMENTS

| 2,808,347 | A | * | 10/1957 | Blatz .......................... 428/451 |
| 4,954,327 | A | * | 9/1990 | Blount ........................ 423/338 |
| 5,519,088 | A | | 5/1996 | Itoh et al. |
| 5,656,195 | A | * | 8/1997 | Mielke et al. .............. 252/62 |
| 5,948,314 | A | * | 9/1999 | Geiss et al. ................ 252/62 |
| 6,068,882 | A | | 5/2000 | Ryu |
| 6,136,216 | A | * | 10/2000 | Fidler et al. ............... 252/62 |
| 6,143,400 | A | * | 11/2000 | Schwertfeger et al. ...... 523/218 |
| 6,478,864 | B1 | | 11/2002 | Field |
| 2003/0077438 | A1 | * | 4/2003 | Frank et al. ............... 428/331 |
| 2003/0099844 | A1 | * | 5/2003 | Hanahata et al. .......... 428/447 |

\* cited by examiner

*Primary Examiner*—David M. Brunsman
(74) *Attorney, Agent, or Firm*—McLeland & Associates, P.L.L.C.

(57) ABSTRACT

A curable coating composition for forming a thermal insulating layer, the composition comprising:
(a) highly porous particles of a material obtained by drying a wet sol-gel, the particles having a porosity of at least 80% and a particle size in the range from 5 μm to 4.0 mm; and
(b) a film forming resin system comprising a film forming polymer,
wherein the particles (a) are dispersed in the resin system (b), and the resin system (b) contains at least one stabilizer having an average molecular weight in the range from about 1,000 to about 4,000, said stabilizer being at least one member selected from the group consisting of ethylene oxide-propylene oxide block copolymers, poly $C_2$–C3 alkoxylated $C_{12}$–$C_{18}$ saturated or unsaturated fatty alcohols, poly $C_2$–C3 alkoxylated hydrogenated or partially hydrogenated castor oils, poly $C_2$–C3 alkoxylated hydrogenated or partially hydrogenated soybean oils, polydimethyl siloxane $C_2$–C3 alkoxylates, and sorbitan esters of $C_{12}$–$C_{18}$ saturated or unsaturated fatty acids, the amount of the particles (a) is in the range from 2 to 6% by weight, based on the weight of the composition, and the amount of the stabilizer is in the range from about 50% to about 90% by weight, based on the weight of the highly porous particles. The composition has high storage stability and forms a coating having excellent insulation value.

25 Claims, No Drawings

COMPOSITION FOR THERMAL INSULATING LAYER

CROSS-REFERENCE TO RELATED APPLICATION

This application claims priority based on U.S. provisional application No. 60/519,400, filed Nov. 12, 2003, which is incorporated herein by reference.

BACKGROUND

The present invention relates to thermal insulation, more specifically to a coating composition for forming a thermal insulating layer on a substrate, a method for forming such a thermal insulating layer, and a method for producing such a composition.

Unintended heat transfer causes inefficiencies in energy use by consumers as well as in industrial settings, with the attending financial costs. Examples of such undesired heat transfer are: heat gain by a building structure from absorption of solar radiation; heat loss from inadequately insulated pipes and other structures, etc. Heat transfer over a prolonged period may cause deterioration of the material to which the heat is transferred. Another impact of unintended heat transfer is the loss of worker productivity due to burn or freeze injuries caused by contact with uninsulated or insufficiently insulated equipment. At the very least, heat stress and cold stress in the workplace reduce worker productivity.

Methods of mitigating unintended heat transfer are known under the rubric of "insulation", and are commonly identified by the composition that constitutes the solid portions of the insulation material. Examples include: polyurethane foam, fiberglass batting, rock wool, loose fill vermiculite or perlite, blown-in cellulose, polystyrene foam, polyisocyanurate foam, acrylic coatings, coatings containing ceramic particles or microspheres, etc.

Each of the insulation methods described above suffers from one or more of the following problems: loss of insulation properties after installation due to the infiltration of dust, moisture, mold, and mildew; corrosion when these materials are used on metal surfaces, due to the accumulation of moisture under the insulation, in particular condensation resulting from the temperature differential created at the interface between the insulation and the substrate; and insufficient insulating properties, particularly in the case of surface coatings.

A goal of the present invention is to provide insulation in the form of a thin layer or coating, which is a protective layer characterized by low thermal conductivity and exhibiting excellent and uniform adhesion to the substrate, thus protecting metal substrates against corrosion and protecting all substrates from mold and mildew. The layer is formed by the application of a liquid coating composition characterized by good storage stability. The inventors' work has resulted in the coating composition of the invention that meets the above stated goal.

The coating composition of the invention contains highly porous particles of a material obtained by drying a wet sol-gel. Such material includes, but is not limited to, materials known as aerogels and xerogels. In its conventional meaning, the term "aerogel" is used to describe a material obtained by drying a wet sol-gel at temperatures above the critical temperature and at pressures above the critical pressure. Under such conditions, the removal of the gel liquid, for example, water, from the sol-gel results in a porous structure without damaging the structure of the gel, so that a high porosity is obtained. Traditionally, the product obtained by drying at conditions below supercritical conditions is known as a "xerogel", which has a lower porosity, with at least some of the pore structure being damaged during the drying process. Since the process of drying under supercritical conditions is very energy intensive and costly, attempts have been made to produce xerogels which approximate the properties of aerogels. Such xerogels are suitable for use in the composition of the invention. For example, U.S. Pat. No. 5,565,142, describes "an extremely porous xerogel dried at vacuum-to-below supercritical pressures but having the properties of aerogels which are typically dried at supercritical pressures. This is done by reacting the internal pore surface of the wet gel with organic substances in order to change the contact angle of the fluid meniscus in the pores during drying."

Silica aerogels were the first extensively studied aerogels. However, aerogels and xerogels may be made with a wide range of chemical compositions. Other inorganic aerogels may be used in the present invention, as well as aerogels prepared from organic polymers, sometimes called "carbon aerogels." Inorganic xerogels and organic xerogels are suitable for the composition of the invention, provided that they have properties similar to aerogels.

Aerogels and xerogels can also be surface treated to alter their properties. For example silica aerogel can be made less hydrophilic by converting the surface —OH groups into —OR groups (wherein R is an aliphatic group). U.S. Pat. No. 6,806,299, the content of which is incorporated herein by reference in its entirety, discloses the preparation of hydrophobic organic aerogels. These chemically modified aerogels are also suitable for use in the composition of the invention, as well as chemically modified xerogels that have properties similar to those of aerogels.

Aerogels are known to have excellent thermal insulation properties, and xerogels having a porosity and pore structure approximating those of aerogels are also good insulators. In known uses for insulation, aerogel particles have been compressed into panels or compacted in an enclosed container or in a flexible bag, optionally with the aid of a binder. In another use, U.S. patent publication 2003-0215640 describes "a heat resistant aerogel insulation composite comprising an insulation base layer comprising hydrophobic aerogel particles and an aqueous binder, and a thermally reflective top layer comprising a protective binder and an infrared reflecting agent." The insulation layer "preferably comprises a foaming agent" and "it is desirable to use as little of the aqueous binder as needed to attain a desired amount of mechanical strength."

U.S. patent publication 2004-0077738 A1 describes "an aerogel-hollow particle binder composition comprising an aqueous binder, hydrophobic aerogel particles, and hollow, non-porous particles, as well as an insulation composite comprising the aerogel-hollow particle binder composition, and a methods (sic) of preparing the aerogel-hollow particle binder composition and insulation composite." The composition "preferably comprises a foaming agent" and "it is desirable to use as little of the aqueous binder as needed to attain a desired amount of mechanical strength."

Prior to the work performed by the present inventors, which forms the subject of this patent application, aerogel and xerogel particles have not been successfully used as the primary insulating agent embedded in a thin layer or coating that is firmly adhered to a substrate, the thin layer or coating being formed by applying a film-forming liquid composition which has good storage stability and is not subject to excessive thickening upon storage. Furthermore, in the present invention, the thermal insulating properties of the aerogel and xerogel particles are not degraded by the other components of the coating composition, for example as a result of damage caused to the delicate pore structure of the particles and/or invasion and saturation of the pores. Also, the aerogel and xerogel particles in the coating formed from the composition of the invention are protected by the inherent physical properties of the coating from damage and disintegration induced by environmental conditions.

SUMMARY

A first object of the invention is to provide a coating composition which contains as an insulating agent highly porous particles of a material obtained by drying a sol-gel, and which forms a coating having sustained structural and performance integrity even in severe service environments, such as found in industrial and manufacturing applications. The insulating layer of the invention is not subject to the infiltration of moisture, dust, mildew, and insects, which cause significant loss of insulating properties in traditional insulation when used in locations where it is exposed to weather and environmental conditions. The insulating layer of the invention can also sustain significant physical impact without being damaged or compressed, which are other common causes of failure in bulk insulating materials.

Another object of the invention is to provide a thermal insulating layer that is fire retardant, in addition to having the characteristics described in the first object of the invention.

Yet another object of the invention is to provide a thermal insulating layer that protects the substrate against corrosion, in addition to having the characteristics described in any of the above objects of the invention.

An additional object of the invention is to provide a thermal insulating layer that protects the substrate against molds and mildew, in addition to having the characteristics described in any of the above objects of the invention.

DESCRIPTION

The curable coating composition of the invention is made of highly porous particles dispersed in a film forming resin system which contains a film forming polymer, and in the presence of a stabilizer as defined below. The particles are particles of a material obtained by drying a wet sol-gel, and have a porosity of at least 80% and a particle size in the range from 5 µm to 4.0 mm.

(i) The Highly Porous Particles

The highly porous particles used in the composition are made of a material which is obtained by drying a sol-gel, and have a porosity of at least 80% and a particle size in the range from 5 µm to 4.0 mm. The chemistry and the production of such materials derived from a sol-gel are well documented in the chemical literature, which discloses various methods for drying the sol-gel and for modifying its surface properties.

The highly porous particles suitable for the composition of the invention include, but are not limited to, aerogel particles prepared by a process wherein the wet sol-gel is dried under supercritical pressure, and xerogel particles prepared by a process wherein the wet sol-gel is dried at a pressure below the supercritical pressure. Particles of amorphous silica aerogels or xerogels may be used, as well as particles of carbon aerogels or xerogels.

The size of the highly porous particles suitable for this invention is in the range of from 5 µm to about 4.0 mm. In one embodiment of the invention, ultrafine particle are used which have a particle size in the range from 5 µm to 1,200 µm, preferably from 5 µm to 500 µm, and more preferably from 5 µm to 15 µm. In another embodiment of the invention, particles having a size in the range from about 0.5 mm to about 4 mm are used.

The highly porous particles used in the invention have a porosity of at least 80%, and preferably at least 90%, the porosity being a measure of the proportion of the volume of the particles that is taken up by air.

The shape of the particles is not particularly limited and includes irregular shapes as well as smooth and symmetrical shapes.

The highly porous particles typically have small pores with a pore size not exceeding 50 µm. In an embodiment of the invention, the particles are characterized by a pore size of about 20 µm.

By virtue of having a high porosity as well as a small particle size, the particles suitable for use in the invention have a high surface area, for example in the range from 600 to 800 $m^2/g$.

The aerogel or xerogel from which the highly porous particles are made may be hydrophobic or hydrophilic. In one embodiment of the invention, the aerogel or xerogel is a nonmetal oxide aerogel or xerogel in which the hydrogen atom in terminal —OH groups is substituted by a non-polar group which imparts hydrophibicity to the aerogel or xerogel. In another preferred embodiment, the aerogel or xerogel is a carbon aerogel or xerogel of an organic compound, in which the hydrogen atom in terminal —CH groups is substituted by a non-polar group which imparts hydrophibicity to the aerogel or xerogel.

The aerogels and xerogels suitable for use in the invention may be prepared by methods known in the art, and are available from commercial suppliers.

(ii) The Resin System

The resin system suitable for the coating composition of the invention may be an aqueous system or a solvent-based system, and contains at least one film forming polymer. The chemistry and production of suitable film forming polymers are well-known, and the polymers are available from numerous commercial manufacturers. Examples of suitable film forming polymers include, but are not limited to, acrylic polymers, acrylic styrene copolymers, vinyl acrylic copolymers, epoxy acrylic copolymers, acrylic vinyl acetate copolymers, alkyds, styrene butadiene copolymers, cellulose acetates polymers, and polyester polymers. The selection of the polymer can be made by those of ordinary skill in the art in view of the specific applications.

In one aspect of the invention, the resin system is an aqueous emulsion of a film forming polymer selected from the group consisting of acrylic copolymers, acrylic styrene copolymers, vinyl acrylic polymers, epoxy acrylic copolymers, acrylic vinyl acetate copolymers, styrene butadiene copolymers, and cellulose acetate polymers.

In another aspect of the invention, the resin system is solvent-based. Suitable solvents include, but are not limited to, aliphatic hydrocarbons, aromatic hydrocarbons, alcohols, acetates, glycol ethers, and glycol ether esters. Specific examples are hexane, toluene, xylene, isopropanol, ethyl acetate, and diethylene glycol monoethyl ether. The selection of the suitable solvent-based system can be made by those of ordinary skill in the art in view of the specific applications.

(iii) The Stabilizer

Given the very high porosity and corresponding low density of the particles dispersed in the composition of the invention, their maximum loading level in a dispersion is quite low. Typically, it is difficult to incorporate the particles into a dispersion in amounts in excess of 0.1 to 0.5% by weight based on the solid content of the dispersion, in particular because such particles are shear sensitive so that mixing at a high shear rate would damage their structure. In addition, many of these particles derived from the drying of a sol-gel, in particular silicas, are thixotropic so that a dispersion loaded with 1% by weight, based on the solid content of the dispersion, may raise the viscosity of the dispersion to about 25,000 centipoise, which is unsuitable for coating applications.

The above problems are mitigated in the composition of the present invention by the use of a stabilizer which is added to the composition before the incorporation of the highly porous particles. The stabilizer is at least one selected from the group consisting of ethylene oxide-propylene oxide block copolymers, poly $C_2$–$C_3$ alkoxylated $C_{12}$–$C_{18}$ saturated or unsaturated fatty alcohols, poly $C_2$–$C_3$ alkoxylated hydrogenated or partially hydrogenated castor oils, poly $C_2$–$C_3$ alkoxylated hydrogenated or partially hydrogenated soybean oils, polydimethyl siloxane $C_2$–$C_3$ alkoxylates, and sorbitan esters of $C_{12}$–$C_{18}$ saturated or unsaturated fatty acids.

The first group of stabilizers in the above list, ethylene oxide (EO)-propylene oxide (PO) block copolymers, are symmetrical copolymers having two EO blocks of the same chain length surrounding a PO block. The ratio of EO to PO in the copolymers can be varied. An example of such a copolymer has the $EO_{13}$-$PO_{30}$-$EO_{13}$ structure.

The stabilizer suitable for use in this invention has an average molecular weight in the range from about 1,000 to about 4,000, preferably from about 2,000 to about 3,000.

The stabilizer is used in a total amount in the range from about 50% to 90% by weight, preferably 60% to 80%, and more preferably 65% to 75%, based on the weight of the highly porous particles.

The chemistry and production of the stabilizers suitable for use in the present invention are known, and a variety of suitable stabilizers are available from commercial manufacturers. Examples of those commercial products are listed in the following table.

| Trademark | Manufacturer | Category |
| --- | --- | --- |
| PLURONICS | BASF | EO-PO copolymers |
| TERGITOL | Dow | EO-PO copolymers |
| RHODASURF | Rhodia | polyethoxylated fatty alcohols |
| ANTAROX | Rhodia | polyethoxylated fatty alcohols |
| CREMOPHOR | BASF | polyalethoxylated castor oils |
| SILWET | Crompton | polydimethyl siloxane alkoxylates |
| TWEEN | Amersham Biosciences | sorbitan esters of fatty acids |

Without being bound to any theory regarding the mechanism by which the above stabilizers help to stabilize the coating composition, the inventors note the possibility that the action of the stabilizers may relate to the presence of long aliphatic chains in their molecules and to their molecular weight range.

(iv) Other Additives

The composition may contain other additives known in the art, as can be determined by those of ordinary skill in the art to improve the coating and "lay flat" properties of the composition. These additives include, but are not limited to: surfactants; leveling agents; rheology modifiers such as thickening agents; anti-foaming agents or defoaming agents; coalescing agents; curing agents (in the case the resin in the composition is not self-curing); and extenders.

The composition optionally may contain a whitening pigment. If titanium dioxide ($TiO_2$), which is a common whitening pigment, is used in the composition of the invention, it must be in the rutile form, to prevent chalking of the composition. In an embodiment of the invention, the coating composition contains rutile in an amount from 5 to 15% by weight, preferably 10 to 12% by weight, based on the weight of the composition.

The coating composition may contain one or more flame retardant, as can be selected by those of ordinary skill in the art. Examples of flame retardants include, but are not limited to, polymer grade montmorillonite clays or aluminosilicates, chlorinated phosphate esters, and bromoaryl ether/phosphates.

The coating composition may also contain one or more fungicide, mildewcide or biocide, as can be selected by those of ordinary skill in the art. Examples of fungicides, mildewcides, and biocides include, but are not limited to, 4,4-dimethyloxazolidine, 3,4,4-trimethyloxazolidine, modified barium metaborate, orthophenyl phenol, 2,4,5-trichlorophenol, and dehydroacetic acid.

The coating composition may also contain one or more anti-corrosion agent, as can be selected by those of ordinary skill in the art. Examples of anti-corrosion agents include, but are not limited to, mercaptobenzothiazole and its salts, and benzothiazole derivatives having hydrophobic groups.

Additional examples of these additives may be found and selected from the Raw Materials Index, published by the National Paint & Coatings Association, 1500 Rhode Island Avenue, N.W., Washington, D.C. 20005, which is incorporated herein by reference in its entirety.

(iv) Preparation of Composition

According to the invention, it is essential that the highly porous particles be added to the resin system and mixed gently under low shear conditions, after all the other components of the composition have already been blended at a higher speed and at moderate to high shear rates. In the most preferred method, the highly porous particles are mixed in a separate vessel with the stabilizer (and a very small amount of water if necessary to form a uniform paste) under extremely low shear conditions. Once a uniform paste is obtained, it is slowly added to the blend of the remaining components with agitation that is characterized by extremely low shear.

In some embodiments of the invention, time savings may be accomplished by omitting the separate pre-mixing of the highly porous particles and the stabilizer, and by adding slowly the highly porous particles to a pre-blend of all the other components of the composition, including the stabilizer. This shortcut method may be used, for example, when a higher amount of the stabilizer is used in the composition.

Regardless of which method is used, the mixing of highly porous particles that are very fine should be carried out in a closed container, because the particles form a fluffy powder that tends to escape into the atmosphere, posing a health hazard to the operator as well as increasing costs by wasting the expensive material.

When an optional whitening pigment is used in the coating composition, the pigment is ground to the desired particle size and mixed into the resin system before the highly porous particles are added.

The present invention provides a method for incorporating into a coating composition the highly porous particles in an amount sufficient to impart good insulation properties to a coating formed from the composition, also preventing excessive thickening of the composition in shelf storage.

The composition of the invention has a Brookfield viscosity of no more than about 12,000 centipoise, preferably not more than about 10,000 centipoise. Therefore, the composition can be sprayed and otherwise handled in the same manner as a conventional coating composition.

The composition of the invention has excellent storage stability, exhibiting a viscosity increase of less than ten percent upon shelf aging for three months. The composition can be applied to a substrate by conventional methods, such as by brush, roller, or spraying. The composition may be applied directly to the substrate, or on top of a conventional primer coat which is first applied to the substrate. A conventional overcoat layer may optionally be applied on top of the layer of the composition of the invention.

The composition of the invention can be used to insulate a wide variety of substrates, including, but not limited to, roofs, ceilings, walls, containers, tanks, pipes, trucks, boats, barges and ships.

The following examples further illustrate aspects of the invention. It should be understood that the examples are not included to limit the invention, and that various changes may be made by those skilled in the art without changing the essential characteristics and the basic concepts of the invention. Unless otherwise indicated, all parts, percentages, ratios, etc., in the examples and the rest of the specification are in terms of weight.

EXAMPLE 1

A clear coating composition was prepared from the components shown in the following table.

| Component | Name | Wt % based on weight of composition |
|---|---|---|
| 1 | Water | 35.24 |
| 2 | ACRYSOL RM825[1] | 0.39 |
| 3 | Propylene glycol | 0.48 |
| 4 | BYK 025[2] | 0.13 |
| 5 | TAMOL 165[3] | 0.85 |
| 6 | ARMOREZ IC2954[4] | 46.95 |
| 7 | Dibutyl phthalate | 0.73 |
| 8 | Dipropylene glycol n-butyl ether | 6.78 |
| 9 | AMP-95[5] | 0.29 |
| 10 | ACRYSOL RM825[1] | 0.48 |
| 11 | PLURONIC L62[6] | 2.90 |
| 12 | BYK 025[2] | 0.23 |
| 13 | NANOGEL 07N[7] | 4.55 |

[1]thickener (Rohm & Haas)
[2]defoamer (BYK Chemie USA)
[3]dispersant (Rohm & Haas)
[4]self crosslinking epoxyacrylic copolymer (MeadWestvaco)
[5]neutralizer, co-dispersant (The Dow Chemical Co.)
[6]EO-PO copolymer (BASF)
[7]silica aerogel (Cabot)

Components 1 and 2 were mixed for 5 minutes in a Cowles mixer. Then components 3, 4 and 5 were added and mixed for 5 minutes, after which components 6–12 were added while mixing just until a uniform dispersion was obtained. In the last step, the silica aerogel particles (component 13) were added slowly and mixed under cover at a low speed not exceeding 500 rpm/hr. A clear liquid coating composition was obtained.

The insulation characteristics of a coating having a thickness of 0.048 inches prepared from this composition were measured by ASTM method ASTM C-518. The results shown below indicate that the coating has outstanding insulation properties.

Thermal Conductivity: 0.058 Btu/hr ft °F.
R-Value=0.048/(12×0.058)=0.069 hr ft$^{2\circ}$ F./Btu
$t_{mean}$=170° F.

EXAMPLE 2

A white coating composition was prepared from the components shown in the following table.

| Component | Name | Wt % based on weight of composition |
|---|---|---|
| 1 | Water | 2.63 |
| 2 | Propylene glycol | 0.42 |
| 3 | BYK 025[1] | 0.11 |
| 4 | TAMOL 731-A[2] | 0.74 |
| 5 | CR 800 TiO$_2$ (rutile) | 13.4 |
| 6 | ARMOREZ IC2954[3] | 39.47 |
| 7 | Dibutyl phthalate | 0.63 |
| 8 | Dipropylene glycol n-butyl ether | 7.7 |
| 9 | AMP-95[4] | 0.25 |
| 10 | PLURONIC L62[5] | 2.51 |
| 11 | BYK 025[1] | 0.20 |
| 12 | SURFYNOL 104-BC[6] | 0.84 |
| 13 | Water | 27.16 |
| 14 | NANOGEL TLD201[7] | 3.94 |

[1]defoamer (BYK Chemie USA)
[2]dispersant (Rohm & Haas)
[3]self crosslinking epoxyacrylic copolymer (MeadWestvaco)
[4]neutralizer, co-dispersant (The Dow Chemical Co.)
[5]EO-PO copolymer (BASF)
[6]wetting agent and defoamer (Air Products and Chemicals)
[7]silica aerogel (Cabot)

Components 1–4 were mixed for 10 minutes at low speed with a vortex mixer. Then component 5 (powder of rutile form of TiO$_2$) was sifted slowly into the vortex mixer. The mixture was covered and dispersed at high speed to a Hegman 6 consistency. The mixing speed was reduced, and components 6–13 were added under continued mixing just until a uniform dispersion was obtained. In the last step, the silica aerogel particles (component 14) were added slowly and mixed for 20 minutes under cover at a low speed not exceeding 500 rpm/hr. A white liquid coating composition was obtained. [Viscosity=3,600–4,400 cps (Spindle 3@20 rpm)].

The insulation characteristics of a coating having a thickness of 0.058 inches prepared from this composition were measured by ASTM method ASTM C-518. The results shown below indicate that the coating has outstanding insulation properties:

Thermal Conductivity: 0.187 Btu/hr ft °F.
R-Value=0.058/(12×0.187)=0.026 hr ft$^{2\circ}$ F./Btu
$t_{mean}$=180° F.

Other embodiments of the present invention will be apparent to those skilled in the art from consideration of the specification and practice of the invention disclosed herein. It is intended that the specification and examples be considered as illustrative only, with the true scope and spirit of the invention being indicated by the following claims.

What is claimed is:

1. A curable coating composition for forming a thermal insulating layer, wherein the composition comprises:
   (a) highly porous particles of a material obtained by drying a wet sol-gel, the particles having a porosity of at least 80% and a particle size in the range from 5 μm to 4.0 mm; and
   (b) a film forming resin system comprising a film forming polymer,
   wherein the particles (a) are dispersed in the resin system (b), and the resin system (b) contains at least one stabilizer having an average molecular weight in the range from about 1,000 to about 4,000, said stabilizer being at least one member selected from the group consisting of ethylene oxide-propylene oxide block copolymers, poly $C_2$–C3 alkoxylated $C_{12}$–$C_{18}$ saturated or unsaturated fatty alcohols, poly $C_2$–C3 alkoxylated hydrogenated or partially hydrogenated castor oils, poly $C_2$–C3 alkoxylated hydrogenated or partially hydrogenated soybean oils, polydimethyl siloxane $C_2$–C3 alkoxylates, and sorbitan esters of $C_{12}$–$C_{18}$ saturated or unsaturated fatty acids, the amount of the particles (a) is in the range from 2 to 6% by weight, based on the weight of the composition, and the amount of the stabilizer is in the range from about 50% to about 90% by weight, based on the weight of the highly porous particles.

2. A composition as in claim 1, wherein said particles are at least one member selected from the group consisting of aerogel particles prepared by a process wherein the wet sol-gel is dried under supercritical pressure, and xerogel particles prepared by a process wherein the wet sol-gel is dried at a pressure below the supercritical pressure.

3. A composition as in claim 1, wherein said particles have a particle size in the range from 5 μm to 15 μm.

4. A composition as in claim 1, wherein said particles have a particle size in the range from 5 μm 500 μm.

5. A composition as in claim 1, wherein said particles have a particle size in the range from 5 μm to 1,200 μm.

6. A composition as in claim 1, wherein said particles have a particle size in the range from about 0.5 mm to about 4.0 mm.

7. A composition as in claim 1, wherein said particles have a porosity of at least 90%.

8. A composition as in claim 1, wherein said particles are amorphous silica aerogel particles.

9. A composition as in claim 1, wherein said particles are amorphous silica xerogel particles.

10. A composition as in claim 1, wherein said particles are carbon aerogel particles.

11. A composition as in claim 1, wherein said particles are carbon xerogel particles.

12. A composition as in claim 1, wherein said resin system is aqueous.

13. A composition as in claim 12, wherein said particles are hydrophobic.

14. A composition as in claim 12, wherein said resin system is an aqueous emulsion of a film forming polymer selected from the group consisting of acrylic polymers, acrylic styrene copolymers, vinyl acrylic copolymers, epoxy acrylic copolymers, acrylic vinyl acetate copolymers, styrene butadiene copolymers, and cellulose acetate polymers.

15. A composition as in claim 1, wherein said resin system is solvent-based.

16. A composition as in claim 15, wherein said particles are hydrophilic.

17. A composition as in claim 1, wherein said film forming polymer is selected from the group consisting of acrylic polymers, acrylic styrene copolymers, vinyl acrylic polymers, epoxy acrylic copolymers, acrylic vinyl acetate copolymers, alkyds, styrene butadiene copolymers, cellulose acetate polymers, and polyester polymers.

18. A composition as in claim 1, which further comprises rutile in an amount from 5 to 15% by weight, based on the weight of the composition.

19. A composition as in claim 1, which further comprises a flame retardant.

20. A method for forming a thermal insulating layer on a substrate comprising the step of applying the composition of claim 1 to the substrate.

21. A method for preparing a coating composition for forming a thermal insulating layer, said method comprising the steps of:
   (a) providing a resin system comprising a film forming polymer and at least one stabilizer having an average molecular weight in the range from about 1,000 to about 4,000, said stabilizer being at least one member selected from the group consisting of ethylene oxide-propylene oxide block copolymers, poly $C_2$–C3 alkoxylated $C_{12}$–$C_{18}$ saturated or unsaturated fatty alcohols, poly $C_2$–C3 alkoxylated hydrogenated or partially hydrogenated castor oils, poly $C_2$–C3 alkoxylated hydrogenated or partially hydrogenated soybean oils, polydimethyl siloxane $C_2$–C3 alkoxylates, and sorbitan esters of $C_{12}$–$C_{18}$ saturated or unsaturated fatty acids, and
   (b) adding to the resin system obtained in step (a) highly porous particles of a material obtained by drying a wet sol-gel, the particles having a porosity of at least 80% and a particle size in the range from 5 μm to 4.0 mm, and mixing the resulting composition at a low shear rate,
   wherein the amount of the particles is in the range from 2 to 6% by weight, based on the weight of the composition, and the amount of the stabilizer is in the range from about 50% to about 90% by weight, based on the weight of the particles.

22. A method as in claim 21, wherein the highly porous particles are pre-mixed slowly and under low shear with the stabilizer and water, if needed, in an amount sufficient to obtain a uniform paste, and the obtained paste is added to the resin system.

23. A method as in claim 21, wherein a whitening agent is mixed with the resin system before step (b).

24. A method as in claim 21, wherein the particles have a porosity of at least 90%.

25. A method as in claim 21, wherein the particles are silica aerogel particles.

* * * * *